United States Patent
Jeong

(10) Patent No.: US 9,148,617 B2
(45) Date of Patent: Sep. 29, 2015

(54) APPARATUS AND METHOD FOR CONTROLLING STORED IMAGE IN IMAGE DISPLAY DEVICE

(75) Inventor: Ju Young Jeong, Gyoungsangbuk-do (KR)

(73) Assignee: LG Electronics Inc., Seoul (KR)

( * ) Notice: Subject to any disclaimer, the term of this patent is extended or adjusted under 35 U.S.C. 154(b) by 985 days.

(21) Appl. No.: 12/446,526

(22) PCT Filed: Oct. 24, 2007

(86) PCT No.: PCT/KR2007/005265
§ 371 (c)(1),
(2), (4) Date: Apr. 21, 2009

(87) PCT Pub. No.: WO2008/051024
PCT Pub. Date: May 2, 2008

(65) Prior Publication Data
US 2010/0194986 A1    Aug. 5, 2010

(30) Foreign Application Priority Data

Oct. 25, 2006  (KR) .................. 10-2006-0103835

(51) Int. Cl.
*H04N 5/76*       (2006.01)
*G11B 27/10*      (2006.01)
(Continued)

(52) U.S. Cl.
CPC ............. *H04N 5/76* (2013.01); *G11B 27/105* (2013.01); *G11B 27/329* (2013.01); *G11B 27/34* (2013.01);
(Continued)

(58) Field of Classification Search
CPC ................ G06F 17/30843; H04N 21/431
USPC ..................... 386/353; 348/570, E05.105
See application file for complete search history.

(56) References Cited

U.S. PATENT DOCUMENTS 6,311,011 B1 * 10/2001 Kuroda .................... 386/297
2002/0054063 A1 * 5/2002 Nishina et al. ........... 345/716
(Continued)

FOREIGN PATENT DOCUMENTS

EP        1 191 790 A2    3/2002
KR     10-2005-0003210     1/2005
(Continued)

OTHER PUBLICATIONS

European Search Report dated Apr. 29, 2010 issued in Application No. 07 83 3574.
(Continued)

*Primary Examiner* — Thai Tran
*Assistant Examiner* — Girumsew Wendmagegn
(74) *Attorney, Agent, or Firm* — Ked & Associates, LLP

(57) ABSTRACT

Provided are an apparatus and a method for controlling a stored image in an image display device. When a time shift function is selected by a user in the image display device having a storage function, information regarding a recording material for each time with respect to time-shifted contents, and exploration to a desired position is conveniently made. That is, a list of time-shifted contents is generated in cooperation with collectable program information and source (channel) information during broadcast, and information for maintenance and management of time shift. The generated list of the contents is displayed in the form of one of summary, a list, and an EPG. When one of the contents displayed on the EPG is selected by the user referring to the EPG, movement is made to a corresponding position, and a corresponding program is reproduced. Therefore, times consumed for searching for and exploring contents, and movement to a position of the contents can he reduced.

11 Claims, 4 Drawing Sheets

(51) Int. Cl.
   *G11B 27/32* (2006.01)
   *G11B 27/34* (2006.01)
   *H04N 5/445* (2011.01)
   *H04N 21/4147* (2011.01)
   *H04N 21/432* (2011.01)
   *H04N 21/433* (2011.01)
   *H04N 21/482* (2011.01)
   *H04N 21/84* (2011.01)
   *H04N 5/781* (2006.01)
   *H04N 9/82* (2006.01)

(52) U.S. Cl.
   CPC ........... *H04N 5/445* (2013.01); *H04N 21/4147* (2013.01); *H04N 21/4325* (2013.01); *H04N 21/4333* (2013.01); *H04N 21/482* (2013.01); *H04N 21/84* (2013.01); *H04N 5/781* (2013.01); *H04N 9/8205* (2013.01)

(56) References Cited

U.S. PATENT DOCUMENTS

| | | | |
|---|---|---|---|
| 2002/0054068 A1* | 5/2002 | Ellis et al. | 345/716 |
| 2002/0199185 A1* | 12/2002 | Kaminski et al. | 725/25 |
| 2003/0093790 A1* | 5/2003 | Logan et al. | 725/38 |
| 2005/0163464 A1* | 7/2005 | Boyle et al. | 386/46 |
| 2005/0204385 A1* | 9/2005 | Sull et al. | 725/45 |
| 2006/0020971 A1* | 1/2006 | Poslinski | 725/44 |
| 2006/0045470 A1* | 3/2006 | Poslinski et al. | 386/68 |
| 2006/0171679 A1 | 8/2006 | Suh | |

FOREIGN PATENT DOCUMENTS

| | | |
|---|---|---|
| KR | 10-2005-0003211 | 1/2005 |
| KR | 10-2006-0022364 | 3/2006 |
| WO | WO 2004/010691 A1 | 1/2004 |
| WO | WO 2005/069613 | 7/2005 |

OTHER PUBLICATIONS

International Search Report dated Jan. 29, 2008.

Chinese Office Action dated Apr. 13, 2010 issued in Application No. 200780039450.X.

* cited by examiner

| TIME | INPUT | TITLE |
|---|---|---|
| 09:00 ~ 09:45 | DTV CABLE 16-11 | SBS MUSIC CAMP |
| 09:45 ~ 10:03 | DTV 500-25 | CNN Larry King |
| 10:03 ~ 10:35 | TV 89-01 | EDGE NEWS |
| 10:35 ~ 10:55 | DTV CABLE 16-11 | WE WANT TO KNOW IT |

APPARATUS AND METHOD FOR CONTROLLING STORED IMAGE IN IMAGE DISPLAY DEVICE

TECHNICAL FIELD

The present disclosure relates to an image display device, and more particularly, to an apparatus and a method for controlling a stored image in an image display device, that display information regarding a recording material for each time with respect to time-shifted contents when a time shift function is selected by a user, and allowing the user to conveniently search for a desired position in the image display apparatus having a storing function.

BACKGROUND ART

Generally, with development of digital technology, digitalization of analog broadcasting has been promoted. Accordingly, digital broadcasting has realized multi-channels and high quality, and a digital television (TV) has developed as an appliance having various applications, as well as a simple TV receiver.

Examples of application products include web TVs and personal video recorders (PVRs) that are under development in many countries. The PVR is also called a digital video recorder (DVR). Unlike a video cassette recorder (VCR) for storing image signals on a magnetic tape, the PVR is a digital recorder for recording/reproducing information to/from a hard disk driver (HDD). When a channel is not selected, the PVR automatically stores and reproduces currently broadcasted signals in/from a HDD in a digital form. Therefore, a time shift function, which is an important function of the PVR, can be performed.

According to a time shift function, when a user presses a stop button and then presses a play button again, reproduction is performed at a point where stored broadcasting signals have been suspended, and after that, storing and reproduction are simultaneously and continuously performed with a predetermined time.

Also, a user can repeatedly view or reproduce a currently broadcasted program in slow motion, and skip a tedious portion.

Meanwhile, the PVR can record all of programs simultaneously broadcasted through various channels. A multi-channel recording method allows a user to record programs broadcasted through various other channels simultaneously with viewing, reproducing, or recording one channel.

That is, an operating method of a TV having a time shift function receives broadcasting signals through a tuner, decodes the received broadcasting signals to display the same in real-time, and simultaneously, processes reconfigured broadcasting signals in the form of data of a long time to store the processed data in a storage medium, and extracts and displays the reconfigured broadcasting signals stored in the storage medium upon reproduction request of a user afterward.

A method for controlling an image in an image display device according to a related art will be described with reference to the accompanying drawings.

FIG. 1 is a flowchart illustrating a method for controlling an image in an image display device according to a related art, and FIGS. 2 and 3 are views illustrating a method for exploring an image in an image display device according to a related art.

Referring to FIG. 1, according to the method for controlling an image in the image display device according to a related art, whether a time shift function has been turned on is judged (S11).

Subsequently, when the time shift function has been turned on as a result of the judgment (S11), desired broadcasting signals are stored in a storage medium (S12).

When a power-on command is input by a user and a channel is changed, the corresponding channel is selected (S13-S16).

DISCLOSURE OF INVENTION

Technical Problem

However, according to the method for controlling an image in the image display device according to the related art, the user should not only memorize information of a time-shifted channel to some extent but also memorize a shift time schematically to search for a position of desired broadcasting.

Also, even when the user memorizes source information and the shift time, much time is consumed in searching for the position. Accordingly, when the number of time shifts increases, information such as source shift times and recorded time/broadcasting information increases.

Also, referring to FIGS. 2 and 3, searching of a time-shifted recording material according to a related art supports only simple searching by dragging through a progress bar. To search for a desired position, a user estimates a schematic time to drag to a corresponding schematic position, and performs precise searching on the schematic position using a method such as rewind/fast forward to find the desired position.

Technical Solution

Embodiments provide an apparatus and a method for controlling a stored image in an image display device, that can generate a list for each time band regarding time shift contents when a time shift function is selected.

Embodiments also provide an apparatus and a method for controlling a stored image in an image display device, that allow a user to more easily move to a desired position of a program and reproduce the program as a list of generated time shift contents is displayed.

The details of one or more embodiments are set forth in the accompanying drawings and the description below. Other features will be apparent from the description and drawings, and from the claims.

Advantageous Effects

The apparatus and method for controlling a stored image in the image display device according to the present disclosure provide the following effects.

First, times consumed for searching for and exploring time-shifted contents, and moving to a predetermined position of the time-shifted contents can be reared.

Second, a time consumed for searching for and exploring by a program unit can be reduced through searching/exploring using a list.

Third, since data of time-shifted contents can be known, convenience can be provided to the user.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

BEST MODE FOR CARRYING OUT THE INVENTION

An apparatus and a method for controlling a stored image in an image display device according to the present disclosure will be described in detail with reference to the accompanying drawings.

Figure 1:
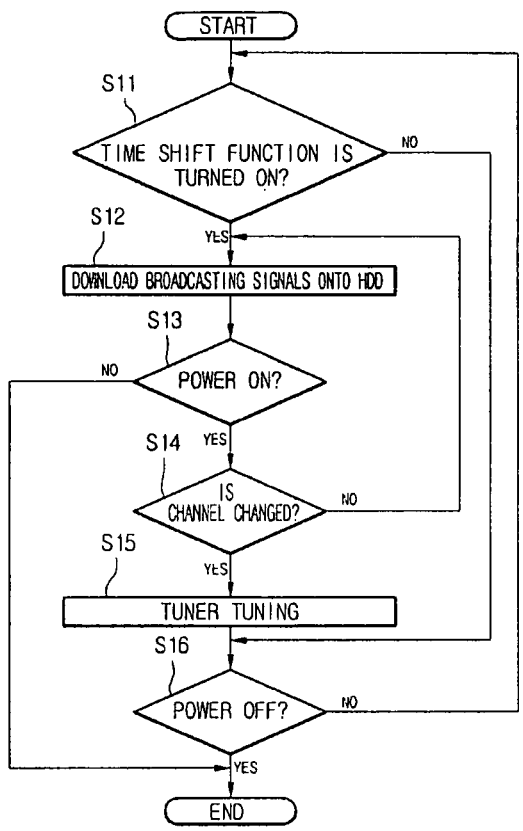
FIG. 1 is a flowchart illustrating a method for controlling a stored image in an image display device according to a related art.
Figure 2:
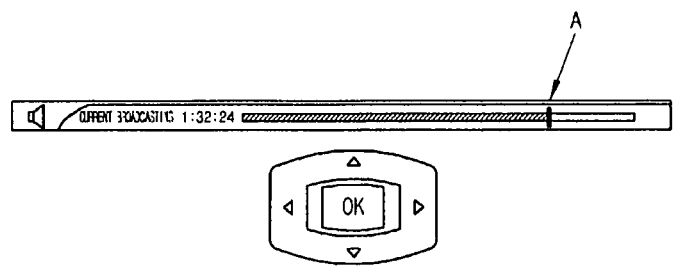
FIGS. 2 and 3 are views illustrating a process of searching for a stored image in an image display device according to a related art.
Figure 3:
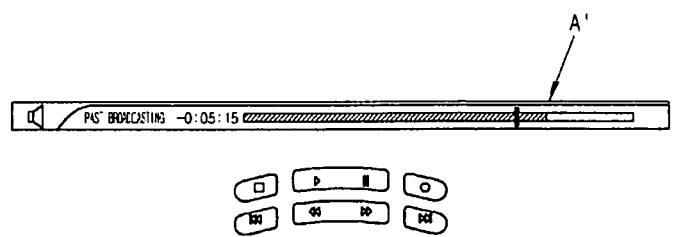
Figure 4:
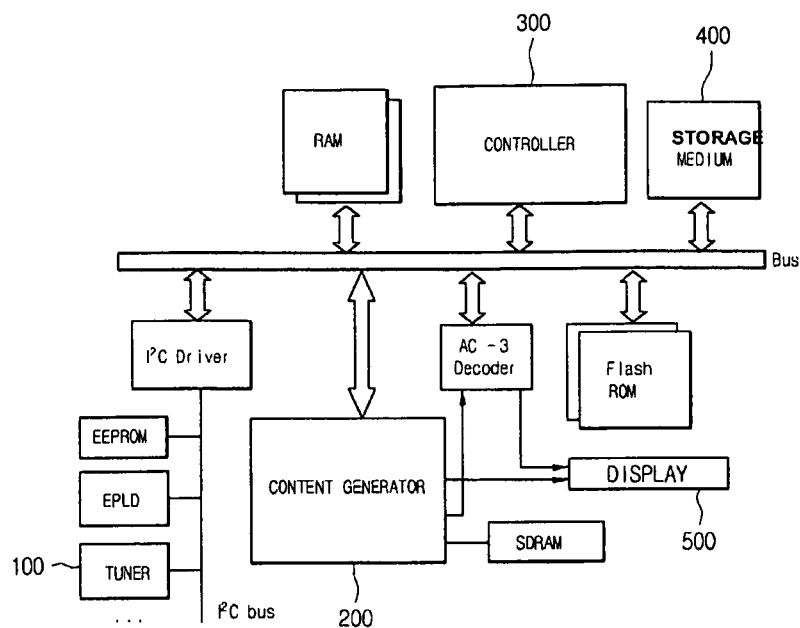
FIG. 4 is a block diagram illustrating an apparatus for controlling a stored image in an image display device according to the present disclosure.
Figure 5:
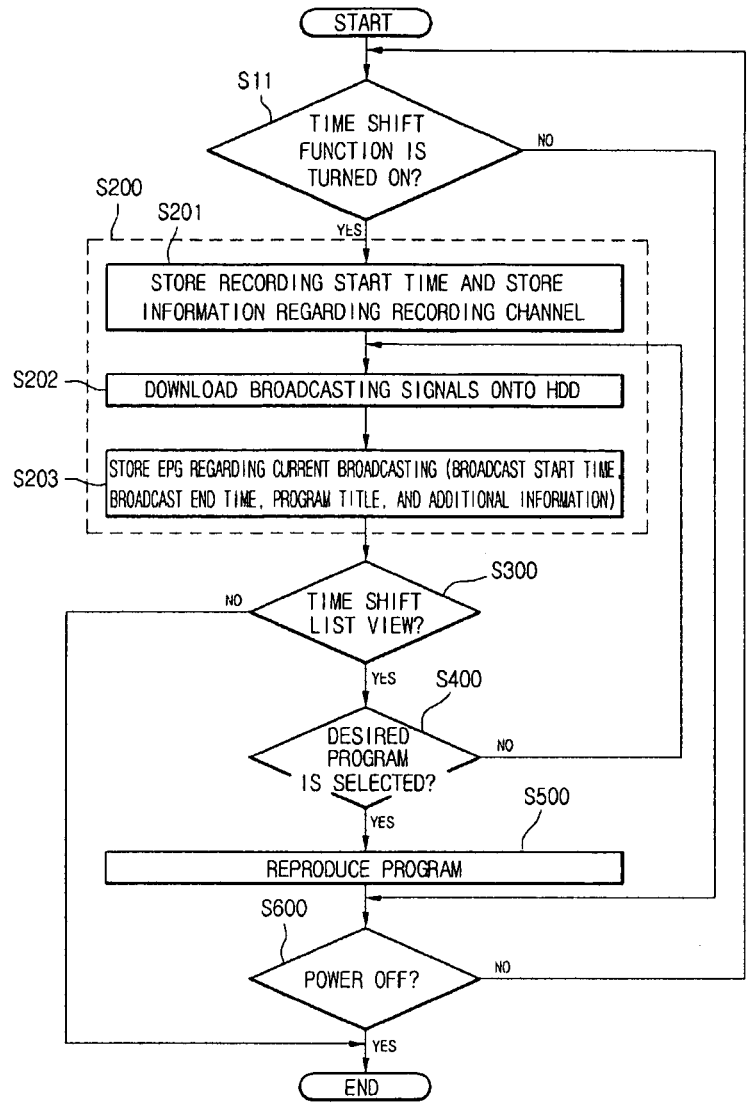
FIG. 5 is a flowchart illustrating a method for controlling a stored image in an image display device according to the present disclosure.
Figure 6:
FIGS. 6 and 7 are views illustrating stored image contents of an image display device according to the present disclosure.
Figure 7:
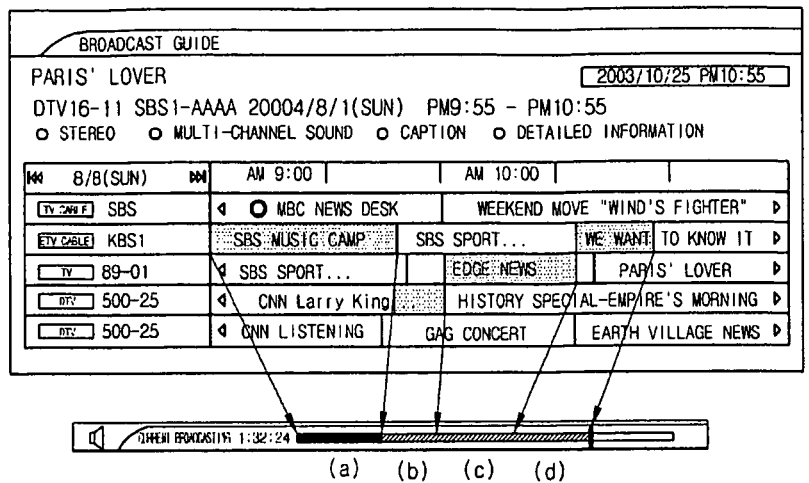

FIG. 4 is a block diagram illustrating an apparatus for controlling a stored image in an image display device according to the present disclosure, FIG. 5 is a flowchart illustrating a method for controlling a stored image in an image display device according to the present disclosure, and FIGS. 6 and 7 are views illustrating a control screen of an image display device according to the present disclosure.

Referring to FIG. 4, the apparatus for controlling a stored image in the image display device includes a tuner 100, a user interface (not shown), a content generator 200, a storage medium 400, a display 500, and a controller 300. The user interface receives a desired command from a user. The content generator 200 generates a list of time-shifted contents from broadcasting information received through the tuner according to a time shift command input through the user interface. The storage medium 400 stores the list generated by the content generator 200, and time-shifted broadcasting signals. The display 400 displays the list of time-shifted contents stored in the storage medium 400 in various forms according to a user s request command input through the user interface. When a desired program is selected by the user from the list of the time-shifted contents displayed on the display 500, the controller 300 controls position movement and reproduction of the program.

The operation of the apparatus for controlling a stored image in the image display device according to the present disclosure will be described below.

First, when a power-on command is input by the user through the user interface, the display 500 processes and displays image signals received through the tuner 100. When a time shift command is input through the user interface, the controller 400 controls start/end points of recording, and information regarding a channel desired to be recorded to be stored in the storage medium 400.

Also, the controller 300 controls broadcasting signals received through the tuner 100 to be stored in the storage medium 400, and controls various information regarding broadcasting stored in the storage medium 400 to be extracted from electronic program guide (EPG) information received through the tuner 100, and stored simultaneously.

That is, when a time shift command is input through the user interface, the controller 300 controls a list of time-shifted contents to be generated with respect to a channel selected by the user. The content generator 200 generates a list of contents regarding a channel and a program in response to a control signal of the controller 300.

For example, when a program is selected through the user interface, a broadcast start time and a broadcast end time are extracted from the EPG, a recording start time and a recording end time are separately stored, title information and other additional information of a time-shifted program are extracted and stored. Also, information regarding through which source a time-shifted program is input is stored, and a recording start time is also stored to know a recording position on a storage region.

Therefore, list information regarding time-shifted recording materials can be provided to the user in the form of a list of a time, an input source, and title information as illustrated in FIG. 6. Also, referring to FIG. 7, a time-shifted region can be displayed in cooperation with a broadcast program guide.

A method for controlling a stored image in the image display device having the above-described construction will be described below with reference to FIG. 5. Whether a time shift function has been selected by a user is judged (S100).

When the time shift function has been selected by the user as a result of the judgment (S100), a list of time-shifted contents is generated (S200).

After that, whether a user has selected a time shift list view is judged (S300).

When the user has selected the time shift list view as a result of the judgment (S300), whether a desired program has been selected from a corresponding list is judged (S400).

When the desired program has been selected as a result of the judgment (S400), the program is reproduced, and when a power-off command is input, an operation is ended (S500-S600).

Here, during operation S200 of generating the list of time-shifted contents, information regarding a recording start time and a recording channel is stored (S201) when the time shift function is turned on by the user.

Also, the broadcasting signals are stored in the storage medium (S202).

Also, while the broadcasting signals are stored, a broadcast start time, a broadcast end time, program title information, and additional information are stored (S203).

As described above, in the apparatus and method for controlling a stored image in the image display device according to the present disclosure, the list of the time-shifted contents is generated on the basis of collectable program information and source (channel) information from broadcasting, and information regarding maintenance and management of time shift. Also, the generated list of the contents is shown in the form of a summary, a list, and an EPG according to the user s request. When contents are selected by the user with reference to the list, movement to a corresponding position is made and a corresponding program is reproduced.

The apparatus and method for controlling a stored image in the image display device according to the present disclosure provide the following effects.

First, times consumed for searching for and exploring time-shifted contents, and moving to a predetermined position of the time-shifted contents can be reduced.

Second, a time consumed for searching for and exploring by a program unit can be reduced through searching/exploring using a list.

Third, since data of time-shifted contents can be known, convenience can be provided to the user.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Industrial Applicability

The apparatus and method for controlling a stored image in an image display device, that display information regarding a recording material for each time with respect to time-shifted contents when a time shift function is selected by a user, and allowing the user to conveniently search for a desired position in the image display apparatus having a storing function.

The invention claimed is:

1. An apparatus for controlling a stored image in an image display device, the apparatus comprising:
   a tuner for receiving broadcasting signals and broadcasting information transmitted from a broadcasting station, the broadcasting information including an electronic program guide (EPG);
   a user interface for receiving a desired command from a user;
   a list generator for generating a list of time-shifted contents based on the EPG, in response to the command, the time-shifted contents representing recorded broadcasting signals and having a form of the EPG;
   a storage medium for storing the list of the time-shifted contents and the recorded broadcasting signals;
   a display for displaying the list of the time-shifted contents and a time-shifted bar, the time-shifted bar including time-shifted regions each corresponding to the time-shifted contents; and
   a controller for controlling position movement and reproduction of the recorded broadcasting signal corresponding to a content selected from the list of the time-shifted contents,
   wherein the time-shifted regions include a highlighted time-shifted region that represents the recorded broadcasting signal that is currently being reproduced.

2. The apparatus according to claim 1, wherein the list generator records recording information of the time-shifted contents and extracts desired information from recording information of electronic program guide information received through the tuner to generate the list of the time shifted contents.

3. The apparatus according to claim 2, wherein the list of the time-shifted contents comprises a broadcast start time, a broadcast end time, a recording start time, a recording end time, program title additional information, source information, and a recording start position of the time-shifted contents from the electronic program guide received through the tuner.

4. The apparatus according to claim 1, wherein, when one of the time-shifted contents displayed on the electronic program guide is selected, the selected contents are displayed so that they are discriminated from the other contents.

5. The apparatus according to claim 1, wherein the highlighted time-shifted region comprises a time shift start point and a time shift end point.

6. A method for controlling a stored image in an image display device, the method comprising:
   receiving a time-shift command from a user;
   generating a list of time-shifted contents based on an electronic program guide (EPG) received from a broadcasting station, in response to the time-shift command, the time-shifted contents representing recorded broadcasting signals and having a form of the EPG;
   storing the list of the time-shifted contents and the recorded broadcasting signals, the recorded broadcasting signals being some broadcasting signals among broadcasting signals received from the broadcasting station;
   displaying the list of the time-shifted contents and a time-shifted bar, the time-shifted bar including time-shifted regions each corresponding to the time-shifted contents; and
   reproducing the recorded broadcasting signal corresponding to a content selected from the list of the time-shifted contents,
   wherein the time-shifted regions include a highlighted time-shifted region that represents the recorded broadcasting signal that is currently being reproduced.

7. The method according to claim 6, wherein the generating of the list of the time-shifted contents is performed using recording information, broadcasting signals, and an electronic program guide of the time-shifted contents.

8. The method according to claim 6, wherein the generating of the list of the time-shift contents comprises storing a broadcast start time, a broadcast end time, program title information, and additional information from an electronic program guide of broadcasting information being received.

9. The method according to claim 6, further comprising, when the time shift command is input by the user, storing a recording start time and information regarding a channel to be recorded.

10. The method according to claim 6, wherein the displaying of the list such that the time-shifted contents are discriminated comprises displaying the time-shifted contents in one of a different color and a different character size.

11. The method according to claim 6, wherein performing the command input by the user with reference to the displayed list comprises: when contents desired by the user are selected from the displayed list of the time-shifted contents, displaying a storage position of a program and simultaneously reproducing the program.

* * * * *